INVENTORS.
Zane L. Ardary
Andrew W. Maxey
Carl D. Reynolds

BY

ATTORNEY.

United States Patent Office 3,577,344
Patented May 4, 1971

3,577,344
FIBROUS THERMAL INSULATION AND METHOD OF MAKING SAME
Zane L. Ardary, Oak Ridge, Andrew W. Maxey, Knoxville, and Carl D. Reynolds, Oak Ridge, Tenn., assignors to the United States of America as represented by the United States Atomic Energy Commission
Filed Jan. 29, 1969, Ser. No. 794,980
Int. Cl. C04b *43/02;* E04b *1/76;* F16l *59/00*
U.S. Cl. 252—62                                    11 Claims

ABSTRACT OF THE DISCLOSURE

Lightweight, high-temperature, thermal insulating material is prepared by molding an admixture or water slurry of small-diameter fibers of a refractory or carbonaceous material and a carbonizable binder consisting of starch particulates. The molded admixture is heated sufficiently to gelatinize the starch, then dried, and thereafter heated sufficiently in an inert atmosphere to pyrolyze the starch for effectively bonding together the fibers. The thermal insulating material is of a density less than 10 lbs./ft.$^3$ and has a thermal conductivity of less than about 1 B.t.u.-in./hr.-° F.-ft.$^2$ at a temperature of 1400° F.

---

Figure 1:
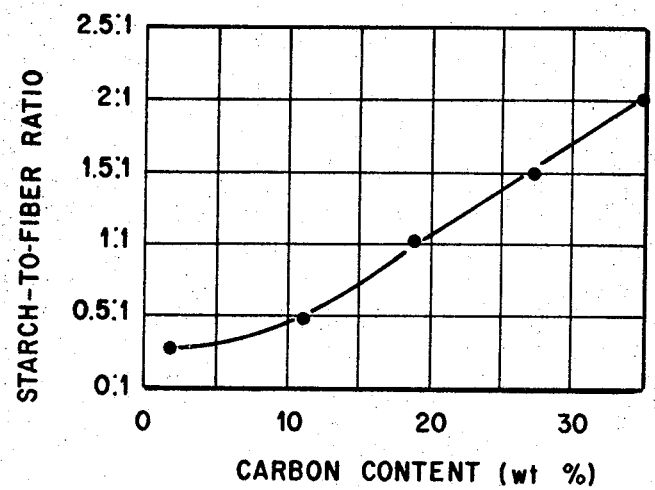

The present invention relates generally to low-density, high-temperature thermal insulation and more particularly to the preparation of such insulation wherein the insulation possesses a thermal conductivity factor or value of less than 1 B.t.u.-in./hr.-° F.-ft.$^2$ at 1400° F. while enjoying a density of less than about 10 lbs./ft.$^3$ and yet exhibiting the capability of being readily machinable into relatively intricate configurations. This invention was made in the course of, or under, a contract with the United States Atomic Energy Commission.

Thermal insulation in aerospace systems is becoming increasingly important due to the high temperatures encountered during operation of various space vehicles and high-speed aircraft. Inasmuch as weight, thermal insulating properties, and shaping or machining capabilities are primary considerations in such applications, the thermal insulating material must exhibit low density, adequate thermal insulating properties, and good machinability. The criteria for the thermal insulation considered desirable for such applications include a thermal conductivity value of less than 1 B.t.u.-in./hr.-° F.-ft.$^2$ at 1400° F., a density of less than about 10 lbs./ft.$^3$, a minimum temperature capability of 2000° F., and sufficient structural integrity to resist forces due to impact, vibration, and acceleration and to be readily machined into relatively intricate shapes. Thermal insulation as previously known fulfills some of the above requirements, but has been found to be somewhat unattractive from the standpoints of density, machinability, and fragility when considered for the envisioned applications.

It is the aim of the present invention to provide a low-density, high-temperature, thermal insulating material which possesses the aforementioned desirable properties and obviates or substantially minimizes the shortcomings and drawbacks suffered by the previously known low-density thermal insulating materials. The thermal insulating material of the present invention is prepared by admixing very-small-diameter fibers made from materials which have a low thermal conductivity and high heat resistance with water and starch in particulate form. The slurry resulting from the fiber-water-starch admixture is formed into the desired configuration with uniform distribution of the starch particulates throughout the molded fiber structure by a vacuum or centrifugal molding operation. The shaped slurry is heated to a temperature sufficient to at least gelatinize the starch, then dried, and subsequently subjected to a temperature sufficient to carbonize the starch and thereby bind together the fibers in a random orientation to form the thermal insulation.

An object of the present invention is to provide low-density, high-temperature thermal insulation which has a density less than about 10 lbs./ft.$^3$, thermal conductivity less than 1 B.t.u.-in./hr.-° F.-ft.$^2$ at a temperature of 1400° F., good resistance to thermal shocks, adequate integrity to permit the machining of the insulation into relatively intricate configurations, and sufficient flexibility or resiliency to withstand relatively severe forces due to vibration impact, and acceleration.

Another object of the present invention is to provide a method of preparing thermal insulating material from small-diameter fibers of materials exhibiting low thermal conductivity and high heat resistance and bonding together these fibers in a random orientation with a carbon binder resulting from the pyrolysis of gelatinized starch.

Other and further objects of the invention will be obvious upon an understanding of the illustrative embodiments and method about to be described, or will be indicated in the appended claims, and various advantages not referred to herein will occur to one skilled in the art upon employment of the invention in practice.

Preferred embodiments of the invention have been chosen for purposes of illustration and description. The preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 2:
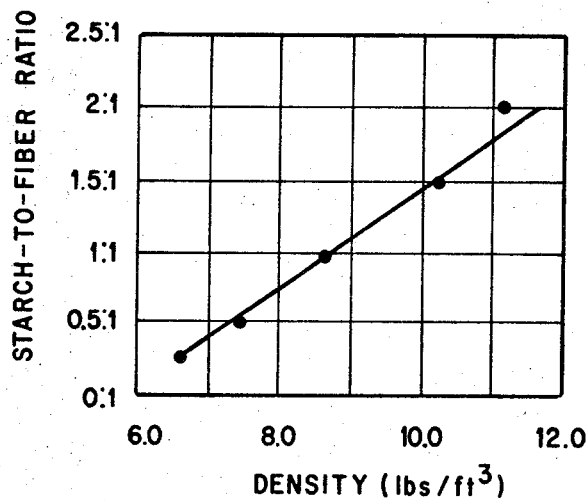
Figure 3:
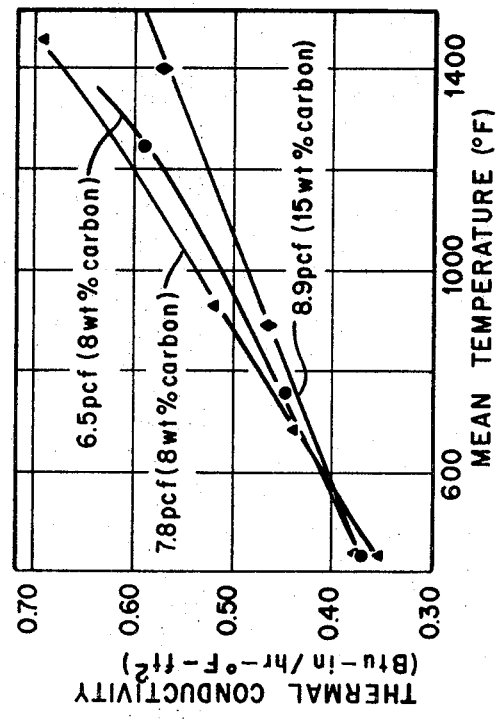
Figure 5:
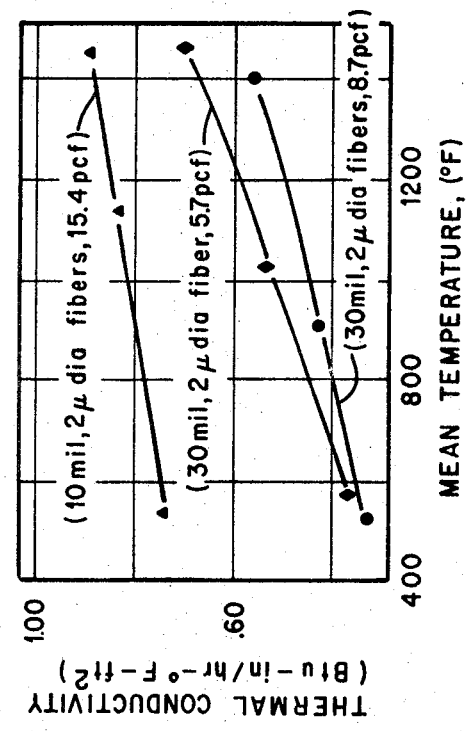
Figure 4:
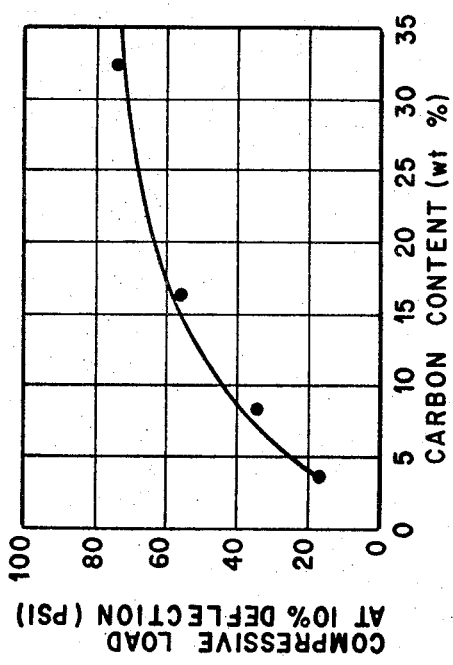

In the accompanying drawings, FIGS. 1–4 are directed to a form of the invention in which the fibers employed in the thermal insulation consist essentially of silicon dioxide; FIG. 1 is a graph illustrating the effect the starch-to-fiber ratio has upon the carbon content of the insulation; FIG. 2 is a graph showing the effect the starch-to-fiber ratio has upon the density of the insulation; FIG. 3 is a graph illustrating the thermal conductivity of the insulation with various percentages of carbon; FIG. 4 is a graph illustrating the compressive strength of the insulating material with respect to the carbon content; and FIG. 5 is a graph illustrating the thermal conductivity of insulation using carbon fibers.

Described generally, the present invention relates to the preparation of a refractory-type fibrous thermal insulating composite characterized by low density, relatively high physical strength, low thermal conductivity (K value), high temperature stability, high resiliency, and possessing sufficient structural integrity to be machined into relatively intricate shapes with good surface quality and edge definition. The fibrous insulation is prepared by mixing together fibers exhibiting low thermal conductivity and high heat resistance such as provided by refractory or carbonaceous materials with a mixture of water and starch particulates which provide the binder for joining together the fibers in a random orientation. The fiber-water-starch mixture or slurry is formed into the desired configuration, with the starch particulates uniformly dispersed throughout the fibers. The starch-water-fiber mixture is then subjected to a sufficient quantity of heat to effect a reaction between the starch and the water to at least gelatinize the starch. After gelatinization and prior to hydrolysis the formed mixture is dried and then heated to a temperature sufficient to convert the starch to carbon for joining together the fibers.

Effective fiber bonding is achieved by gelatinizing the starch and is dependent upon the extent to which the starch is gelatinized before completion of the drying operation. In the presence of water and heat, starch undergoes the following reactions:

starch→gelatinization→dextrins→maltose→glucose

During the formation of the fiber-starch-water slurry the ungelatinized starch is in the form of crystalline granules consisting of an amylopectin membrane surrounding an amylose center. Gelatinization of the starch occurs when the membrane surrounding the granules ruptures, releasing the amylose core which forms a colloidal dispersion in the water. Disruption of the membrane begins in most vegetable starches in the presence of water at temperatures between 64° and 71° C. Iodine tests conducted on a fiber-starch-water slurry which had been heated to a temperature of 95° C. in a water-vapor-saturated atmosphere for a duration of four hours followed by conventional low-humidity drying demonstrated that the starch had undergone gelatinization but that no hydrolysis, i.e., the formation of dextrins or glucose, had occurred. The necessity of carrying the water-starch reactions to at least the gelatinization step becomes readily apparent upon examination of the microstructure of the fibrous insulation by employing conventional scanning and transmission electron microscope techniques. These examinations reveal that the gelatinized starch is more concentrated at the fiber junctures, although some wetting of the individual fibers may occur and, after carbonization of the gelatinized starch, the bond between the discrete fibers is formed by thin, multilayered laminar sheets of the carbonized starch, with the thickness of a single sheet being about 100 angstroms. Due to the capillary attraction of the colloidal starch the principal bonding occurs at the junctures of the fibers, with additional bonding occurring between adjacent fiber edges, and through complete encapsulation of fibers by laminar sheets of carbonized starch. On the other hand, the internal appearance of fibrous insulation in which the water-starch reaction did not reach gelatinization, the carbonized starch was present along the edges of the fibers as small granules which resulted in a very weak or ineffective bond between the fibers.

The starch employed as the fiber binding agent is a vegetable starch exhibiting virtual insolubility in water, but ready dispersement with slight agitation. Of the various vegetable starches available, starches having a particle size range of 10 microns and larger are preferred since they readily adhere to the fibers in the slurry, whereas an excessive portion of the starches of a particle size range less than about 10 microns tend to pass through the slurry without attaching to the fibers.

The formation of the fibrous insulation into composites or structures of the desired configuration while providing relatively smooth surface finishes and uniform wall thicknesses of 1.5 inches or more has been satisfactorily achieved by employing a vacuum molding process. Basically, a vacuum or pulp molding process found suitable comprises the steps of separating the fibers from intertwined clumps or agglomerates of the fibers by a conventional screening technique, slurrying the fibers in water containing the desired quantity of starch and stirring the mixture for a period of about 30 minutes to assure uniform distribution of the starch particulates, feeding the slurry from a mixing tank into a molding assembly containing a perforated mold which is under the influence of vacuum for drawing off excess water and holding the mixture against the mold, placing the mold assembly in a heated, water-saturated atmosphere at a temperature of about 95° C. for a duration in the range of about 8 to about 20 hours to gelatinize and partially set the starch, removing the partially set composite from the mold and continuing the drying operation at low humidity and at about the same temperature for approximately an additional 20 to 32 hours (if desired, higher temperatures, e.g., up to about 150° C., may be used for the drying step to complete drying more rapidly), and thereafter pyrolyzing or carbonizing the starch at a temperature in the range of about 900–1200° C. in an inert atmosphere for about 16 to 36 hours to join together the fibers. As an alternative to the vacuum molding process, a centrifugal molding operation may be employed. The centrifugal formation of the insulation may possibly be advantageous over the vacuum forming technique in that an improved control over the density of the composite may be realized. With the centrifugal molding operation the starch gelatinizing, drying, and carbonization temperatures and times may be similar to those employed in the vacuum molding operation.

The fibers employed in the insulation are preferably formed of silicon dioxide (98.5 percent $SiO_2$), which provides lower thermal conductivity and higher heat resistance characteristics than other fibers used in the insulation. The silicon dioxide fibers found to be satisfactory are of lengths in the range of about 0.125 to 0.5 inch and of an average diameter in the range of about 0.50 to 0.75 micron. The silicon dioxide fibers undergo about a 7-percent linear shrinkage on heating to about 2000° F. and an additional .5-percent linear shrinkage upon further heating to 2750° F. The heating of the fibers to 1000° C. during the manufacture of the insulation preshrinks the fibers so that subsequent heating has little effect upon the length of the fibers. The density and other properties of the insulation are affected by the length and the diameter of the fibers in that the use of shorter but larger-diameter fibers than those above described increases the density of the insulation, while with longer fibers a good dispersion of the latter is not readily achieved and results in inhomogeneity in the molded composite.

In addition to the silicon dioxide fibers, satisfactory results have been achieved using carbon fibers of about 2-micron diameter and 10-, 30-, and 50-mil lengths. Insulation produced from fibers of 10-, 30-, and 50-mil lengths provided thermal insulation composites having densities of 15.4, 8, and 6 lbs./ft.$^3$, respectively. At a mean temperature of 1200° F., the K values for such composites were 0.86, 0.62, and 0.56 B.t.u.-in./hr.-° F.-ft.$^2$. Other fibers found to be satisfactory in the thermal insulation include graphite and refractories such as zirconia, thoria, aluminum silicate, kaolinite, bauxite, magnesite, dolomite, chromite, silicon carbide, etc.

In preparing composites of the thermal insulation the quantity of water employed in the mixture should be adequate to gelatinize the starch in the presence of the aforementioned temperatures and also facilitate the formation of the desired composite configuration by the vacuum or centrifugal molding procedures. Satisfactory results have been achieved by using a slurry with a fiber-to-water ratio in the range of about 2 to 10 grams of fibers per liter of water. However, when using fiber-to-water ratios greater than about 8 grams fiber per liter of water in the vacuum molding process, care should be exercised to assure sufficient agitation, that is, mixing of the slurry, as well as removal of excess water from the mold so as to prevent the formation of uneven surface finishes and non-uniform wall thicknesses. In the vacuum molding process 5 grams of fiber per liter of water provided a desirable fiber-to-water ratio since the resulting structures have smooth wall surfaces and uniform wall thicknesses.

The density of the thermal insulation using silicon dioxide fibers and as prepared by a vacuum molding process is primarily determined by the fiber length, fiber diameter, and the concentration of carbon resulting from the pyrolysis of the starch. As shown in FIGS. 1 and 2, increasing the starch-to-fiber ratio in a range from about 0.25:1 to 2.0:1 in the slurry will result in an increase in the carbon content of the fibrous composite of about 2 to 35 weight percent (FIG. 1) and a corresponding increase in the density from about 6 to about 11 lbs./ft.$^3$ (FIG. 2). Starch-to-fiber ratios of about 0.25:1 produce a bonding or joining of the fibers that is relatively weak, which renders the insulation somewhat difficult to machine, while starch-to-fiber ratios of 2:1 and higher results in increased difficulty in the formation of the composites by vacuum molding. A starch-to-fiber ratio of about 0.75:1 has been found to provide insulation of good structural integrity which is readily machined and has a low density of about 8 lbs./ft.$^3$.

The thermal conductivity of the insulation produced in accordance with the present invention is shown in FIG. 3. These data represent measurements taken in a nitrogen atmosphere on insulation having densities of 6.5 lbs./ft.$^3$ (8 weight percent carbon), 7.8 lbs./ft.$^3$ (8 weight percent carbon), and 8.8 lbs./ft.$^3$ (15 weight percent carbon). At a mean temperature of 600° F. the K values of these composites were nearly identical, as shown (0.39 B.t.u.-in./hr.-° F.-ft.$^2$). With the temperature increasing to about 1600° F., the thermal conductivity of the 7.8-lb./ft.$^3$ and the 8.9 lb./ft.$^3$ insulation increased nearly linearly to a K value of 0.68 at 1400° F. and 0.57 at 1400° F., respectively. The additional carbon in the higher-density composite apparently improves the opacity to radiant heat transfer. A slight difference in the conductivity between the two composites containing 8 weight percent carbon but differing in density (6.5 lbs./ft.$^3$ and 7.8 lbs./ft.$^3$) appears to suggest that small variations in fiber packing density do not significantly affect the thermal conductivity of the insulation. Reduction in the amount of radiant heat transfer and improved strength are simultaneously achieved by incresing the concentration of the carbon binder. However, increasing the concentration of the carbon binder necessarily increases the density of the insulation and there is a point at about 15 weight percent carbon beyond which increased carbon content would not greatly enhance the strength or heat transfer properties of the insulation. The approximate density of this "optimized" insulation having 15 weight percent carbon would be about 9 lbs./ft.$^3$. The specific heat of thermal insulation containing 2.0 and 19.2 weight percent carbon is respectively 0.183 and 0.163 cal./gm.-° C. at 50° C., approximately 0.20 cal./gm.-° C. at 100° C. for both composites, and 0.222 and 0.232 cal./gm.-° C. at 250° C. As expected, at the higher temperatures the specific heat becomes somewhat independent of temperature.

The concentration of carbon in the insulation has a significant effect upon the strength of the latter, as shown in FIG. 4. The compressive load required for 10-percent deflection of various carbon concentrations is illustrated. Increasing the carbon content from about 4 to 30 weight percent resulted in a significant increase in strength; however, as the concentration of carbon binder was increased above about 12 weight percent, the rate of improvement of strength showed a marked decrease. Flexural tests on insulation containing 30 weight percent carbon yielded an average strength of 2820 p.s.i. and a modulus of elasticity of 15.2×10$^6$ p.s.i., whereas an average strength of 655 p.s.i. was found for insulation containing 16.7 weight percent carbon.

The insulation exhibits desirable resistance to vibration, shock, and acceleration forces. Insulation having a density of 8.6 lbs./ft.$^3$ was subjected to vibration forces provided by a 10-percent repeated cyclic compressive strain at 220 cycles per second for a period of 5 seconds and a 1.6-percent repeated cyclic compressive strain at 500 cycles per second for a period of 5 seconds. Shock conditions of 50 G's at an 11-millisecond half-sine pulse and 70 G's at a 1-millisecond half-sine pulse were simulated using a drop shock tester. The insulation was also subjected to an acceleration force of 200 G's along longitudinal and lateral axes. Except for a slight loss of carbon, the thermal insulation of the present invention maintained its structural integrity during these physical tests and suffered no permanent dimensional changes.

With the insulation of the present invention, machining to final dimensions is readily accomplished by employing a simple one-step process. Single-point tools or multi-toothed carbide cutters have a tendency to catch or snag the insulation, resulting in an undesirable surface finish, while metal-bonded diamond grinding wheels effect good machining of insulation since they provide a cutting action rather than a plowing action. Grinding wheels and machining parameters found to be satisfactory include wheels formed of metal-bonded diamond of 30–40 grit and 100 concentration while employing a wheel surface speed of 5000 ft./min. together with moving the insulation at 300 ft./min. Dressed and shaped aluminum oxide wheels may be employed to cut grooves and slots in the insulation composites. Also, thin slitting wheels or saws can be used for slicing and cutting-off operations.

As pointed out above, the silicon dioxide fibers used in the perferred form of the insulation may be replaced by other fibrous materials such as carbon. Composites produced from carbon fibers of various diameters enjoy K values somewhat comparable to the K values provided by the silicon dioxide fibers. As shown in FIG. 5, three composites of 15.4 lbs./ft.$^3$, 5.7 lbs./ft.$^3$, and 8.7 lbs./ft.$^3$ provide thermal conductivity values less than 1 B.t.u.-in./hr.-° F.-ft.$^2$ at 1400° F. in a nitrogen atmosphere. The lower thermal conductivity of the 8.7-lb./ft.$^3$ composite at elevated temperature as compared with the 5.7-lb./ft.$^3$ composite can be attributed to the higher carbon content which improves the opacity to radiant heat transfer. The 15.4-lb./ft.$^3$ composite, on the other hand, had the highest thermal conductivity over the temperature range of 600–1400° F. due to the higher density of fiber packing, which results in an increase in the solid conductivity of the insulation. The rate of increase in K values with temperature is generally lower for the higher-density fibrous carbon composites. This relationship occurs whether the increase in density is attributable to a higher concentration of the carbonized starch or to a tighter packing of the carbon fibers. (The thermal conductivity data for the fibrous composites in FIG. 5 are provided by 10-mil fibers, 30-mil fibers, and 30-mil fibers, respectively, of 2-micron diameter and were prepared with starch-to-fiber ratios of 1.6:1, 0.8:1, and 3.20:1, respectively.) The resulting concentrations of carbon provided by the carbonization of starch for these starch-to-fiber ratios were 24, 12, and 48 weight percent, respectively.

In order to provide a more facile understanding of the present invention, an example of a typical vacuum molding operation is set forth below. This example relates to the formation of an insulation composite using silicon dioxide fibers, but it is to be understood that insulations using other fibers such as mentioned above may be similarly formed.

EXAMPLE

A fibrous composite was prepared by employing 0.25-inch fibers having an average diameter in the range of 0.5 to 0.7 micron. Prior to admixing the fibers with the starch and water they were pulled through a 0.25-inch screen opening to break up any agglomerates in the fibers. A sufficient quantity of starch was then added to provide a 0.75:1 starch-to-fiber ratio, and a water-to-fiber slurry ratio of about 380 liters per kilogram of fibers was employed. The slurry was agitated for 30 minutes and then transferred to a molding assembly containing a perforated mold coupled to a vacuum at 26 inches of mercury. After a dewatering time of 7 minutes under the influence of the vacuum the temperature of the mold assembly was increased to 95° C. in an atmosphere saturated with water vapor for a 4-hour duration to gelatinize the starch. After gelatinization, the formed composite was dried for 24 hours at low humidity and then heated to 1000° C. for 16 hours to carbonize the starch.

It will be seen that the thermal insulation provided by the present invention represents a significant improvement in the heat insulating art since the density of the material together with its low thermal conductivity and structural integrity provides features heretofore unavailable. Further, the insulation can be employed in environments at temperatures greater than 2000° F. and up to about 5000° F. with the carbon fibers embodiment by confining the insulation in a inert atmosphere or vacuum so as to inhibit the oxidation of the carbonized starch which begins in air at a temperature above about 500° F.

What is claimed is:

1. A fibrous thermal insulating composite of a density less than about 10 lbs./ft.³ and a thermal conductivity of less than 1 B.t.u.-in./hr.-° F.-ft.² at 1400° F., comprising a plurality of discrete fibers of a carbonaceous or refractory material joined together in a random orientation and principally at junctures formed therebetween by a binder consisting essentially of carbonized starch which has been previously gelatinized.

2. The fibrous thermal insulating composite as claimed in claim 1, wherein the carbon provided by the carbonized starch represents about 2 to about 35 weight percent of the composite, and wherein the composite is of sufficient structural integrity to withstand a compressive load of up to about 70 pounds per square inch for effecting a 10-percent deflection in the composite.

3. The fibrous thermal insulation composite as claimed in claim 1, wherein the fibers consist essentially of silicon dioxide, are of a length in the range of about 0.125 to 0.5 inch, and are of a diameter in the range of about 0.5 to 0.7 micron.

4. The fibrous thermal insulating composite as claimed in claim 1, wherein the fibers consist essentially of carbon, are of a length in the range of about 10 to 50 mils, and have a diameter of about 2 microns.

5. A method of preparing a thermal insulating composite consisting essentially of randomly oriented fibers joined together by a carbonized binder and having a density less than about 10 lbs./ft.³ and a thermal conductivity less than 1 B.t.u.-in./hr.-° F.-ft.² at 1400° F., comprising the steps of admixing a plurality of fibers of a carbonaceous or refractory material with a quantity of particulate starch sufficient to provide a minor weight percentage of the composite when carbonized and a quantity of water adequate to form a slurry of the fibers and starch, forming the slurry into the configuration selected for said composite, heating the slurry to a temperature sufficient to effect a reaction between the starch and the water for at least gelatinizing the starch, maintaining the reaction for a duration sufficient to at least gelatinize essentially all of said starch, heating said slurry to a temperature sufficient to remove substantially all of the water from the formed composite, and thereafter heating the formed composite in an inert atmosphere to a temperature sufficient to carbonize the starch and thereby bind together the fibers.

6. The method of preparing a thermal insulating composite as claimed in claim 5, wherein the quantity of starch in the composite provides about 2 to 35 weight percent of the composite when carbonized.

7. The method of preparing a thermal insulating composite as claimed in claim 5, wherein the starch is a vegetable starch having a particle size greater than about 10 microns, and wherein the reaction is completed prior to hydrolyzing the starch.

8. The method of preparing a thermal insulating composite as claimed in claim 5, wherein the fibers consist essentially of silicon dioxide of a length in the range of about 0.125 to 0.5 of an inch and a diameter in the range of about 0.5 to 0.7 micron, the quantity of starch represents a ratio of starch to fiber in the range of about 0.25:1 to 2.0:1, and wherein the adequate quantity of water represents a fiber-to-water ratio in the range of about 2 to about 10 grams of fibers per liter of water.

9. The method of preparing a thermal insulating composite as claimed in claim 5, wherein the fibers consist of carbon of a length in the range of about 10 to about 50 mils and a diameter of about 2 microns, and wherein the quantity of starch represents a ratio of starch to fiber in the range of about 0.8:1 to about 3.2:1.

10. The method of preparing a thermal insulating composite as claimed in claim 5, wherein the temperature sufficient to effect the reaction between the starch and water is greater than a temperature in the range of about 64° to 71° C., the temperature for drying the composite is greater than about 95° C., and wherein the temperature for carbonizing the gelatinized starch is greater than about 900° C.

11. The method of preparing a thermal insulating composite as claimed in claim 5, wherein the forming of the slurry into the selected configuration is provided by contacting a mold with the slurry, subjecting the slurry to a pressure less than atmospheric to form and maintain the slurry in a contacting relationship with the mold, and maintaining the pressure less than atmospheric pressure to remove excess water from the slurry.

References Cited

UNITED STATES PATENTS 3,514,403    5/1970    Muendel _____ 252—62

HAROLD ANSHER, Primary Examiner

U.S. Cl. X.R.

156—336; 161—182, 206